Dec. 24, 1968  C. C. PERRY  3,417,813
FLUIDIC THERMOSTAT
Filed Aug. 5, 1966

INVENTOR
CHARLES C. PERRY

BY *Olsen and Stephenson*
ATTORNEYS

United States Patent Office 3,417,813
Patented Dec. 24, 1968

3,417,813
FLUIDIC THERMOSTAT
Charles C. Perry, Ann Arbor, Mich., assignor to W. M. Chace, Detroit, Mich., a corporation of Delaware
Filed Aug. 5, 1966, Ser. No. 570,633
8 Claims. (Cl. 165—35)

ABSTRACT OF THE DISCLOSURE

A thermostat in which a hollow body has a chamber provided at one end with an inlet port and at the opposite end with outlet ports, the chamber being in substantially the shape of a proportional fluid amplifier. A bimetallic deflector is mounted in the chamber at a location generally between the inlet and outlet ports and at a position to be engaged by fluid entering the chamber through the inlet port. The deflector moves in response to a change in the temperature of the fluid in the chamber so as to vary the proportional amounts of fluid which flows to the outlet ports.

---

This invention relates generally to temperature control in fluid systems and more particularly to an improved fluidic thermostat.

Temperature control of fluid is desirable in various fluid systems. Examples of such fluid systems utilizing temperature responsive bimetal elements are shown in U.S. Patent No. 1,943,705 and U.S. Patent No. 3,091,393. However, none of the prior systems have used the thermostatic bimetal element as a deflector in conjunction with a jet of fluid. It is an object of this invention, therefore, to provide an improved fluidic thermostat in which a temperature responsive bimetal element is utilized as a deflector or fluid guiding member to proportion the flow of fluid through one or more heat exchangers to amounts which will maintain a substantially uniform fluid temperature in a working zone.

In the thermostat of this invention, a hollow body of the general configuration employed in proportional fluid amplifiers is provided with a nozzle or inlet port which communicates with a main chamber. The main chamber is provided with a plurality of outlet ports, and a thermostatic bi-metal deflector element is mounted in the main chamber between the inlet port and the outlet ports. The main chamber is contoured so as to avoid bi-stable operation as a result of jet attachment to either side wall of the main chamber so that the direction of flow of fluid in the chamber is determined principally by the position of the deflector element. The element is positioned so that it extends lengthwise of the chamber between the inlet port and the outlet ports and is fixed to the hollow body adjacent the inlet port. At the desired operating temperature of the fluid, the deflector element, which is structed so that its deflection in the main chamber is unrestrained, directs the primary volume of the fluid in the main chamber into one of the receiving ports. As the temperature changes from this desired temperature, the element flexes so as to direct an increasing amount of the fluid through the other port which is connected to a heat exchanger. The heat exchanger raises or lowers the temperature of the fluid sufficiently to compensate for the temperature change and thereby maintain a desired uniform temperature. This arrangement or combination of a bi-stable fluid amplifier and a bimetal deflector provides a very simple fluidic thermostat which is reliable in operation and requires a minimum of maintenance because of the reduced number of moving parts. The deflector element can also function similarly in a hollow body which is connected to both heating and cooling heat exchangers.

Further objects, features and advantages of this invention will become apparent from a consideration of the following description, the appended claims, and the accompanying drawing in which:

Figure 1:
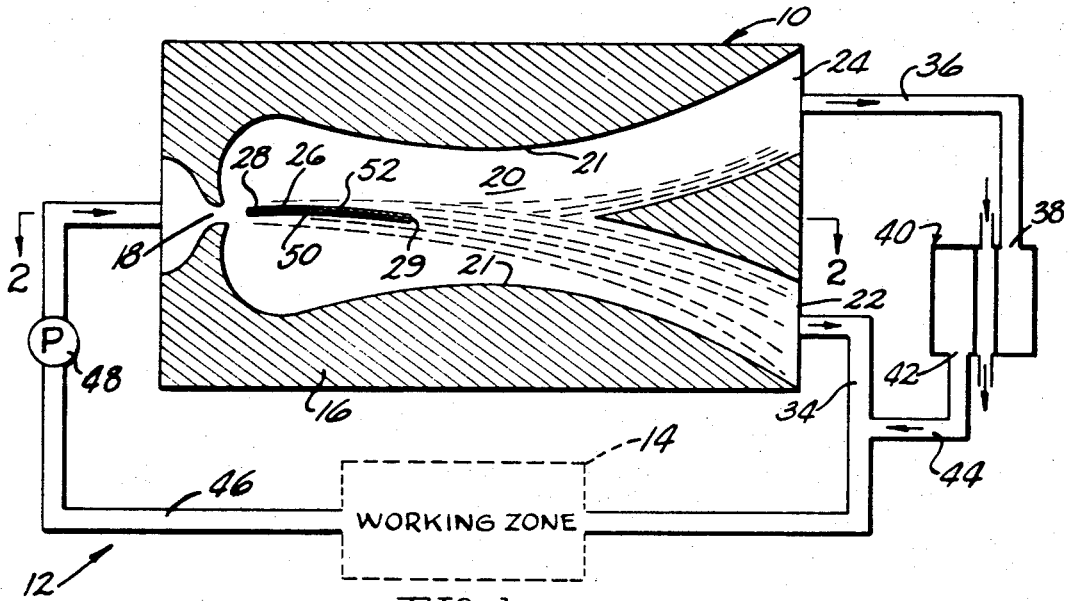
FIGURE 1 is a diagrammatic view of a fluid system showing the improved fluidic thermostat of this invention in assembly relation therewith.
Figure 2:
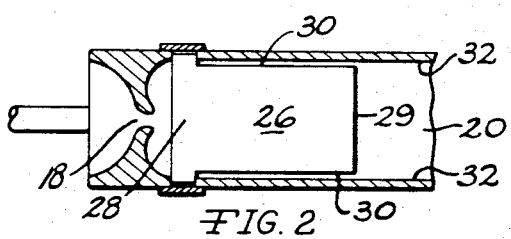
FIGURE 2 is a fragmentary sectional view of the fluidic thermostat of this invention as seen from substantially the line 2—2 in FIG. 1.

With reference to the drawing, the fluidic thermostat of this invention, indicated generally at 10, is illustrated in FIG. 1 in a fluid system 12 designed to maintain a constant fluid temperature in a working zone indicated generally at 14. The thermostat 10 consists of a hollow body 16 of the general configuration employed in proportional fluid amplifiers in that it has a nozzle or inlet port 18 which communicates with a main chamber 20 from which fluid exits through a primary outlet port 22 and a secondary outlet port 24. The main chamber 20 is contoured so as to avoid bi-stable operation as a result of jet attachment to either of its side walls 21.

A fluid deflector or directing element 26 is mounted in the chamber 20 for varying the proportional amounts of fluid flowing out of the body 16 through the outlets 22 and 24. The element 26 is formed of thermostatic bi-metal and is in generally plate form having an end portion 28 positioned adjacent the inlet port 18 so that the element 26 is in the path of the jet of fluid entering chamber 20 through inlet port 18. Only the end portion 28 of the element 26 is fixed to the body 16. The remainder of the element 26, including the free end 29 thereof, is dimensioned so that the edges 30 thereof are spaced from the adjacent walls 32 of the chamber 20. The purpose of this configuration of the bimetal member 26 is to permit unrestrained deflection of the member 26 in the chamber 20. It can thus be seen that the temperature of the jet of fluid in the chamber 20 determines the inclination and position of the deflector 26. The inclination of the member 26 in turn determines the relative proportions of the fluid jet directed to the outlet ports 22 and 24.

A conduit 34 connected to the primary outlet port 22 is connected to the working zone 14. A second conduit 36, which communicates with the secondary outlet port 24, is connected to the inlet 38 for a heat exchanger 40. The outlet 42 for the heat exchanger 40 is connected to another conduit 44 which is connected to the conduit 34 intermediate its ends. The heat exchanger 40 can be of a type which either adds heat to the fluid supplied thereto by the conduit 36 or takes heat from the fluid supplied by the conduit 36, depending on whether the working zone 14 adds heat or takes heat from the fluid supplied thereto from conduit 34. In either event, the function of the heat exchanger 40 is opposite to the heating or cooling effect on the fluid in the working zone 14. A conduit 46, having fluid propulsion means such as a pump 48 therein, returns fluid from the working zone 14 to the nozzle 18.

The deflector element 26 is constructed such that at the desired operating temperature of the fluid flowing through the chamber 20, the element 26 is bent approximately as shown in FIG. 1. In this position of the element 26, the portion of the fluid jet impinging upon the concave side 50 of the element is directed into the primary discharge port 22. The portion of the jet flowing along the convex side 52 of the element 26 is also largely deflected toward the primary receiving port 22 as a result of the Coanda effect which causes the jet to remain attached to the convex surface 52. When the element 26 deflects to move the free end 29 upwardly, as shown in FIG. 1, an increased proportion of the jet is directed into secondary port 24, and when element 26 deflects to move the free end 29 downwardly a decreased proportion of the jet is directed into secondary port 24.

Assumed that the fluid in the system 12 is to perform a heating function in the working zone 14, in which case heat is taken out of the fluid in the working zone 14. In such case, in the event the fluid supplied to the working zone 14 is below the desired temperature, the element 26 will deflect in a direction such that it deflects a larger fraction of the jet from the inlet port 18 into the secondary discharge port 24 from which it passes through the heat exchanger 40, which in this case adds heat to the fluid, so that the net result is an increase in the temperature of the fluid supplied to the working zone 14. If, however, in the working zone 14, the fluid temperature is generally increased, as, for example, in the cooling system of an internal combustion engine, the element 26 is constructed so that as the temperature of the element 26 increases, it will deflect to direct an increasing fraction of the jet into the secondary discharge port 24. In such case, the heat exchanger 40 operates to remove heat from the fluid supplied to the conduit 36.

Thus, in both cases, the bimetal element 26 cooperates with the hollow body 16 to maintain a desired uniform temperature in the working zone 14. The element 26 can either be constructed, as to the contents and relative thicknesses of the laminations thereof, so as to maintain a predetermined temperature in the working zone 14, or the element 26 can be adjustably mounted on the body 16 for movement to various settings at which it will maintain different predetermined temperature depending on the setting, as desired. The element 26 functions continuously to maintain the desired temperature.

Figure 3:
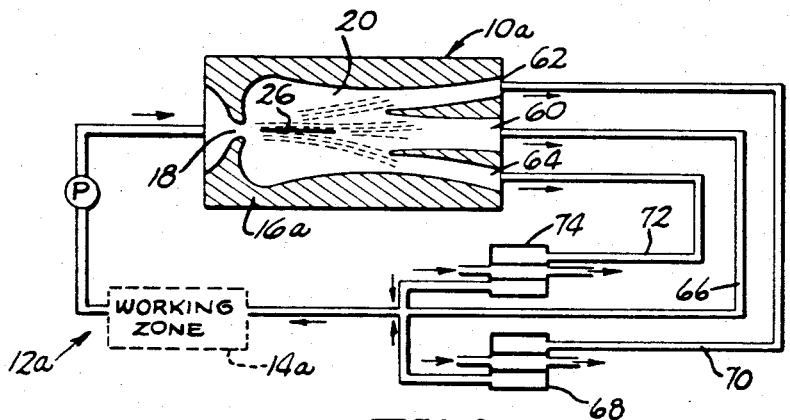
FIGURE 3 is a diagrammatic view of a modified form of the fluidic thermostat of this invention, illustrated similarly to FIG. 1.

A modified form 10a of the fluidic thermostat of this invention is illustrated in FIG. 3 adapted for a system 12a in which heat can be either gained or lost in a working zone indicated at 14a. In the thermostat 10a, the body 16a is formed so that it has a primary discharge port 60 located between a pair of secondary receiving ports 62 and 64. The primary receiving port 60 is connected to a conduit 66 which communicates with the working zone 14a. The discharge port 62 is connected by a conduit 70 to a heat exchanger 68 which is capable of adding heat to the fluid from the conduit 70, and the discharge port 64 is connected to a conduit 72 which communicates with a heat exchanger 74 which removes heat from the fluid supplied from the conduit 72. The thermostat 10a includes the bimetal deflector 26 which flexes in response to temperature changes in the fluid jet issuing from inlet orifice 18 so as to proportion the flow through the secondary discharge ports 62 and 64 so as to maintain a predetermined desired temperature in the working zone 14a. The primary flow is through the discharge port 60 at all times.

From the above description, it is seen that this invention provides improved fluidic thermostats 10 and 10a which are operable continuously to maintain a desired fluid temperature in the working zones 14 and 14a, respectively, by virtue of the flexing action of the bimetal elements 26 in the fluid amplifier shaped chambers 20.

It will be understood that the fluidic thermostat which is herein disclosed and described is presented for purposes of explanation and illustration and is not intended to indicate limits of the invention, the scope of which is defined by the following claims.

What is claimed is:

1. A fluidic thermostat comprising a hollow body having an inlet port means for a fluid jet and a plurality of outlet port means located downstream from said inlet port means for receiving proportional amounts of fluid entering said body through said inlet port means, deflector means movably mounted in said body at a location generally between said inlet and outlet port means at a position to be engaged by said fluid jet and control the proportional amounts of fluid direction to said outlet port means, said deflector means being formed of a temperature responsive material and being operable on movement in response to a change in the temperature of fluid flowing between said inlet and outlet port means to vary the proportional amounts of fluid directed to said outlet port means.

2. A fluidic thermostat according to claim 1 in which said hollow body has a chamber between said inlet and outlet port means in substantially the shape of a proportional fluid amplifier and said deflector means is mounted in said chamber.

3. The structure according to claim 2 in which said deflector means consists of a plate formed of thermostatic bimetal and having a pair of ends, said plate having one of its ends positioned adjacent said inlet port and extending from said one end toward said outlet port means, said one end being affixed to said body so that the remaining portion of said plate can undergo unrestrained deflection in said chamber.

4. The structure according to claim 1 further including heat exchanger means connected to at least one of said outlet port means and said inlet port means whereby said deflector means and said heat exchanger means are cooperable to maintain fluid in a zone between said heat exchanger means and said inlet port means at a substantially uniform temperature.

5. The structure according to claim 4 in which said body has a pair of discharge ports one of which is connected to said heat exchanger, first conduit means connecting said heat exchanger to said zone, second conduit means connecting the other one of said discharge ports to said first conduit means, and third conduit means connecting said zone to said inlet port means.

6. The structure according to claim 1 wherein said deflector means is a slightly bent strip of thermostatic bimetal.

7. A fluidic thermostat comprising a hollow body having an inlet port for a fluid jet and a plurality of outlet ports located downstream from the inlet port for receiving proportional amounts of fluid entering said body through said inlet port, said plurality including a pair of discharge ports and a third discharge port disposed between said pair, deflector means movably mounted in said body at a location generally between said inlet and outlet ports in a position to be engaged by said fluid jet, said deflector means being formed of a temperature responsive material and being operable on movement in response to a change in temperature of fluid flowing between said inlet and outlet ports, said discharge ports being arranged relative to said deflector means such that said movement of said deflector means operates to vary the relative volumes of fluid directed to said pair of ports, a heat adding heat exchanger connected to one of said pair of ports, a heat removing heat exchanger connected to the other one of said pair of ports, said deflector means being arranged to deflect so as to direct increasing proportions of fluid in said body to said one port in response to decreases in temperature of fluid flowing through said body, first conduit means connecting said third discharge port to a zone at which a uniform fluid temperature is desired, means directing fluid from said heat exchangers into said first conduit means upstream from said zone, and second conduit means connecting said zone to said inlet port.

8. The structure according to claim 7 wherein said deflector means is a slightly bent strip of thermostatic bimetal.

References Cited

UNITED STATES PATENTS

| | | | |
|---|---|---|---|
| 1,984,892 | 12/1934 | Phillips et al. | 236—12 |
| 2,886,245 | 5/1959 | Griesler | 236—12 |

(Other references on following page)

UNITED STATES PATENTS

| | | | |
|---|---|---|---|
| 3,187,762 | 6/1965 | Norwood | 137—81.5 |
| 3,198,431 | 8/1965 | Gesell | 236—13 |
| 3,209,775 | 10/1965 | Dexter et al. | 137—81.5 |
| 3,213,929 | 10/1965 | Marshall et al. | 165—35 |
| 3,223,103 | 12/1965 | Trinkler | 137—83 |
| 3,266,512 | 8/1966 | Turick | 137—81.5 |
| 3,275,014 | 9/1966 | Plasko | 137—81.5 |
| 3,290,893 | 12/1966 | Haldopoulos | 137—81.5 XR |
| 3,279,531 | 10/1966 | Bowles | 165—26 |

ROBERT A. O'LEARY, *Primary Examiner.*

MANUEL A. ANTONAKAS, *Assistant Examiner.*

U.S. Cl. X.R.

137—81.5; 236—12